United States Patent
Gilmore et al.

(10) Patent No.: US 9,771,158 B2
(45) Date of Patent: Sep. 26, 2017

(54) ICE PROTECTION OF AERODYNAMIC SURFACES

(75) Inventors: Christopher John Gilmore, Farnborough (GB); Greg Peter Wade Fixter, Farnborough (GB)

(73) Assignee: QINETIQ LIMITED (GB)

( * ) Notice: Subject to any disclaimer, the term of this patent is extended or adjusted under 35 U.S.C. 154(b) by 2023 days.

(21) Appl. No.: 11/883,102

(22) PCT Filed: Feb. 3, 2006

(86) PCT No.: PCT/GB2006/000374
§ 371 (c)(1),
(2), (4) Date: Jul. 25, 2007

(87) PCT Pub. No.: WO2006/085054
PCT Pub. Date: Aug. 17, 2006

(65) Prior Publication Data
US 2008/0099617 A1  May 1, 2008

(30) Foreign Application Priority Data

Feb. 9, 2005  (GB) .................... 0502644.8
Jul. 22, 2005  (GB) .................... 0515078.4

(51) Int. Cl.
*B64D 15/14*  (2006.01)
(52) U.S. Cl.
CPC .................... *B64D 15/14* (2013.01)
(58) Field of Classification Search
USPC .......................... 244/134 D, 134 R
See application file for complete search history.

(56) References Cited

U.S. PATENT DOCUMENTS

| | | | | |
|---|---|---|---|---|
| 2,757,273 A | * | 7/1956 | Taylor | 219/537 |
| 3,013,752 A | * | 12/1961 | Kenneth | 244/134 R |
| 3,420,476 A | * | 1/1969 | Schultz et al. | 244/134 D |
| 3,705,819 A | * | 12/1972 | Heller et al. | 427/541 |
| 3,814,647 A | * | 6/1974 | Scher et al. | 156/219 |
| 4,036,457 A | * | 7/1977 | Volkner et al. | 244/134 D |
| 4,656,339 A | | 4/1987 | Grise | |
| 4,786,349 A | * | 11/1988 | Mahn, Sr. | 156/234 |
| 5,351,918 A | * | 10/1994 | Giamati et al. | 244/134 D |
| 5,657,951 A | * | 8/1997 | Giamati | 244/134 D |

(Continued)

FOREIGN PATENT DOCUMENTS

| | | |
|---|---|---|
| EP | 0991300 | 1/2002 |
| EP | 1 486 417 | 12/2004 |
| FR | 1 230 668 | 9/1960 |

(Continued)

*Primary Examiner* — Tien Dinh
(74) *Attorney, Agent, or Firm* — McDonnell Boehnen Hulbert & Berghoff LLP

(57) ABSTRACT

An electrothermal heater mat for anti-icing or de-icing of a helicopter rotor blade or other aerodynamic surface comprises a substrate, such as a flexible polyimide sheet, bearing tracks of a material of selected electrical resistivity, these tracks being formed by printing onto the substrate with a thermosetting ink loaded with electrically conductive (e.g. carbon) particles. Electrical bus bars/terminals for the supply of electrical energy to the resistive tracks may also be printed, using an ink loaded with particles of higher conductivity material such as copper or silver.

23 Claims, 2 Drawing Sheets

(56) References Cited

U.S. PATENT DOCUMENTS 6,338,455 B1    1/2002  Rauch

FOREIGN PATENT DOCUMENTS

| | | |
|---|---|---|
| GB | 488 820 | 7/1938 |
| GB | 662 540 | 12/1949 |
| GB | 787 581 | 12/1957 |
| GB | 860 213 | 2/1961 |
| GB | 1 194 090 | 6/1970 |
| GB | 1 234 954 | 6/1971 |
| GB | 1 258 014 | 12/1971 |
| GB | 1 332 703 | 7/1973 |
| JP | 10312705 | 11/1998 |

\* cited by examiner

ICE PROTECTION OF AERODYNAMIC SURFACES

BACKGROUND OF THE INVENTION (1) Field of the Invention

The present invention relates to the ice protection of aerodynamic surfaces. In principle the invention may be applicable to the protection of any form of aerodynamic surface which is liable to encounter icing conditions in service, including in particular the surfaces of aircraft wings, propellers, stabilisers, fins, engine nacelles and radomes, helicopter rotor blades and wind energy turbine blades.

(2) Description of the Art

As is well known, ice accretion can occur on an aerodynamic surface when subject to an airflow containing airborne water at a temperature below or near its freezing point. The uncontrolled build up of ice on such surfaces is undesirable for many reasons, including the additional weight which must be carried, reduction of the aerodynamic efficiency of the surface, the imposition of out of balance loads on the structure, and the danger to other structures or persons from uncontrolled shedding of the ice. Many forms of ice protection systems for such surfaces are therefore already known, one large class of which comprises electrothermal means where electrical resistance heating elements, for example in the form of wires, foils, sprayed metal matrices or conductive fabrics, are used to raise or maintain the temperature of the surface above the local freezing point. Within the nomenclature of electrothermal ice protection systems "anti-icing" refers to the process of maintaining a surface at a temperature above freezing point over a continuous period of time so that ice is prevented from forming, while "de-icing" refers to the process of permitting a certain limited amount of ice to build up on a surface and periodically removing it by heating the surface at selected intervals. The present invention seeks to provide a form of electrothermal ice protection system which is adaptable to use with a wide variety of aerodynamic surfaces and may offer significant manufacturing cost advantages in comparison with systems currently in service.

SUMMARY OF THE INVENTION

In one aspect the Invention accordingly resides in a structure including an aerodynamic surface and equipped with an electrothermal heater mat in proximity to such surface for ice protection of the same, said mat comprising a substrate bearing heater tracks of a material of selected resistivity, said tracks being formed by printing onto the substrate with a thermosetting ink containing electrically conductive particles and curing such ink.

The invention also resides per se in a heater mat as defined above in the first-mentioned aspect, and in a method of producing the same by printing heater tracks of a material of selected resistivity onto a substrate with a thermosetting ink containing electrically conductive particles and curing such ink.

In use of a mat according to the invention an electrical current is caused to pass through the printed tracks to cause Joulean heating, and the supply of electrical energy will be controlled to provide anti-icing or de-icing of the respective surface, or a combination of the two over different regions, as required. The liberation of heat for this purpose is of course a function of the current (and therefore the applied voltage) and the resistivity of the material in the respective tracks, the latter being dependent on the composition of the ink and the width and thickness at which it is printed, all of which can be controlled to achieve a desired performance.

By employing a printing process for the formation of the tracks on the substrate in a mat according to the invention, typically a flat bed or rotary screen printing process, heaters of practically any desired configuration to suit respective surfaces to be protected can be produced relatively inexpensively, and with accurate control of the shape and thickness of the resistive tracks.

The ink system which is used for producing the resistive tracks preferably comprises a thermosetting medium—such as a phenolic (phenol/formaldehyde) or epoxy resin—loaded with carbon particles and optional inert filler (e.g. alumina) to achieve a desired resistivity. Such inks can produce heater tracks with accurately determined and stable resistances when printed and cured under controlled conditions, and have been found to be suitable for screen printing tracks with surface resistivities from 10 to 100,000 Ohm/square depending on the ratio of carbon to inert filler, although for the purposes of Joulean heating an upper limit in the region of 1,000 Ohm/square will generally be appropriate. Where heater tracks of higher conductivity are required, surface resistivities of 0.1 to 10 Ohm/square have been produced using an equivalent medium loaded with a mixture of carbon and silver particles. These thermosetting inks can be printed in a single thick (in printing terms) film, typically up to around 25 μm but selectable by appropriate choice the mesh type of the screen. Phenolic based inks are typically cured at 180° C. for an hour. Some epoxy based inks may cure at normal room temperatures, although are more usually cured at elevated temperature to speed the setting reaction.

Preferably bus bars or the like conductors for the supply of electrical energy to the resistive tracks are also printed on the same substrate, in this case typically with an ink loaded with particles of silver or copper. For example thermosetting thick film inks comprising a phenolic or epoxy resin loaded with silver have been used to print conductors with a surface resistivity in the region of 0.05 Ohm/square. Where a higher current carrying capacity is required, an alternative Ink system comprises a highly loaded paste of silver particles in a high boiling point solvent which, when printed and then fired at high temperature (typically 200° C. for half an hour) converts to virtually pure metal and has been found to produce deposits with a surface resistivity in the region of 0.005 Ohm/square.

The substrate in a mat according to the invention may be rigid or flexible, although a flexible substrate has the advantage of enabling ready conformance of the mat to profiled surfaces during assembly and accommodating any natural flexure of the structure in service. Where the ink is of a kind which requires curing at elevated temperature, a thin polyimide or other heat-resistant polymer sheet is a preferred flexible substrate.

If it is required to provide a dielectric layer over the heater tracks and associated conductors (if any) of a mat according to the invention this may be achieved by an additional printing step to deposit an electrically insulative material over the tracks/conductors or simply over the whole surface of the mat. This layer may comprise a varnish composed of the same resin as is used in the type of thermosetting ink referred to above (when the latter is chosen for printing the resistive tracks and/or conductors) but without the carbon and/or metal inclusions. This may be of advantage in providing an insulating layer with similar mechanical or other (non-electrical) properties to the tracks/conductors. However other materials may be used for this purpose, in particular UV curable systems which may be quicker to cure and more flexible. If desired, an additional insulative layer of this kind may provide a base for further printed heater tracks and/or associated conductors. Gaps can be left in the insulative layer if connections are required to the tracks/conductors beneath. This kind of sandwich construction enables more complex designs of heater networks and positioning of bus bars (which are essentially cold spots) to be achieved than with a single printed layer. A similar effect could be achieved by printing on both sides of the basic substrate. For example heater tracks could be printed on one side overlapping bus bars printed on the other side, to minimise the cold spot effect, with electrical connections being made through the substrate as required.

In another preferred embodiment of a structure according to the invention, the resistive tracks could be printed onto a reinforcement cloth to be incorporated in a polymer composite material forming part of the aerodynamic structure, the tracks becoming encapsulated within the composite for enhanced physical protection.

DESCRIPTION OF THE FIGURES

The invention will now be more particularly described, by way of example, with reference to the accompanying schematic drawings, in which.

DESCRIPTION OF A PREFERRED EMBODIMENT

Figure 1:
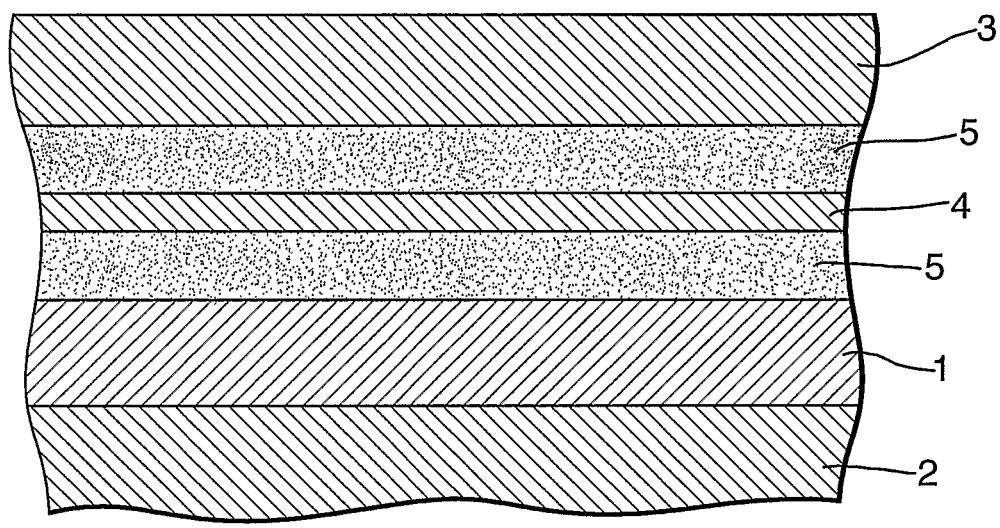
FIG. 1 is a vertical section, not to scale, through part of the structure of a helicopter rotor blade equipped with an ice protection heater mat in accordance with the invention.

With reference to FIG. 1, this illustrates part of the upper portion of a helicopter rotor blade structure close to its leading edge. Indicated at 1 and 2 are parts of the internal base layers of the blade construction and Indicated at 3 is part of the usual erosion shield (metallic or polymer) which defines the outer surface of the leading edge region. Located between the base structure and erosion shield is an electrothermal heater mat 4 comprising printed resistive tracks (not shown in FIG. 1) for heating the erosion shield for anti-icing and/or de-icing purposes when energised, this being shown sandwiched between layers of adhesive 5 which provide electrical insulation and bonding of the erosion shield to the base structure.

Figure 2:
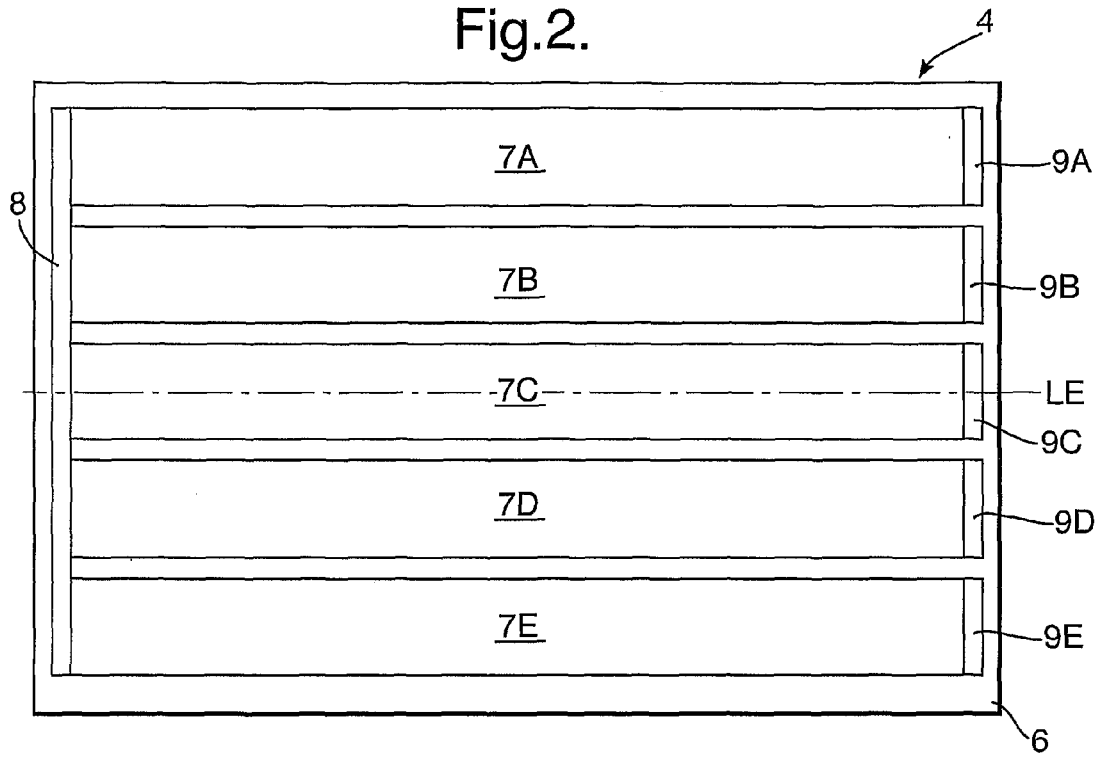
FIG. 2 is a plan view, prior to installation, of one embodiment of heater mat for the structure of FIG. 1.
Figure 3:
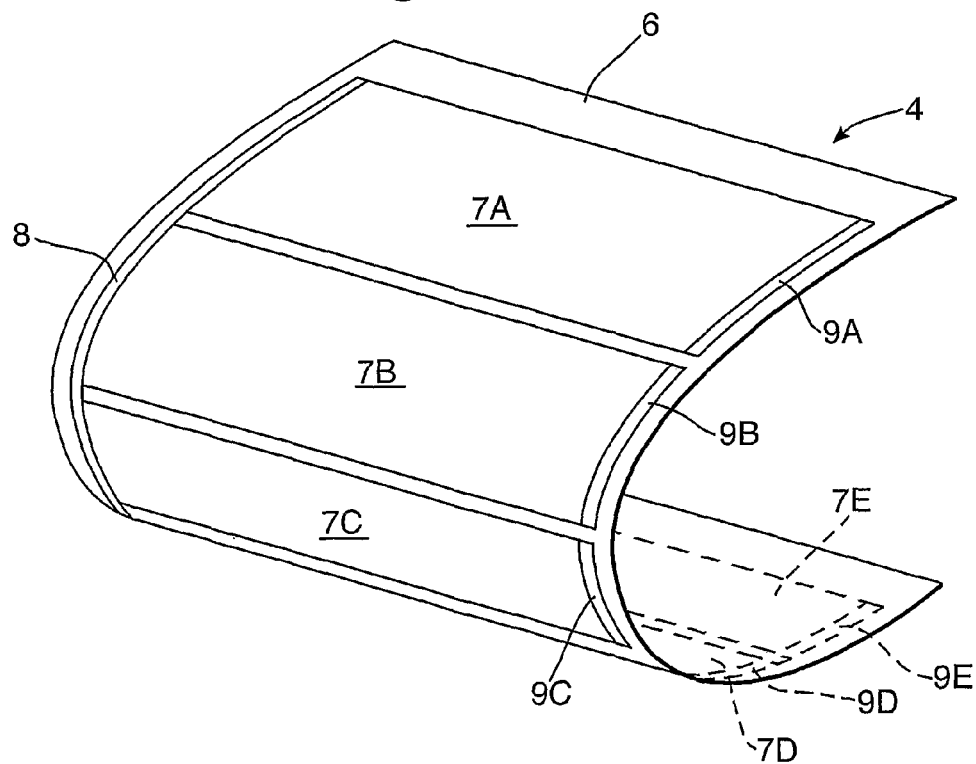
FIG. 3 illustrates the configuration of the heater mat of FIG. 1 when installed

One embodiment of a heater mat 4 is shown in FIGS. 2 and 3, it being understood that this is one of a plurality of such mats which will be installed in spanwise succession along the length of the blade. It is shown in flat form in FIG. 2 and in FIG. 3 in the curved form which it adopts when installed beneath the erosion shield around the leading edge region of the blade. The relative position of the spanwise extreme leading edge is shown by the broken line LE in FIG. 2.

In the embodiment of FIGS. 2 and 3 there is a dielectric substrate 6, such as a polymide sheet typically 50-100 μm thick, on which are screen printed five parallel resistive tracks 7A-7E. The tracks 7A-7E are printed in a single layer with a carbon-loaded thermosetting ink so as to be electrically conductive but with high resistance so as to generate heat for transfer to the erosion shield when energised. A common bus bar 8 is provided in contact with one end of each track 7A-7E and individual terminals 9A-9E are provided in contact with the respective opposite ends of each track, the bus bar and terminals being connected to an electrical supply system (not shown) so that if required the energisation of each track can be controlled individually. The bus bar 8 and terminals 9A-9E are also formed by screen printing a conductive ink onto the substrate 6, in this case loaded with silver or copper for higher conductivity.

In the installed condition as indicated in FIG. 3, the heater mat 4 is flexed to lie under the erosion shield with the central track 7C disposed to coincide with the extreme leading edge, tracks 7B and 7A extending aft beneath the upper surface of the erosion shield and tracks 7D and 7E extending aft beneath its lower surface. As previously indicated the energisation of each track can be controlled individually and in one embodiment the following control protocol may be adopted. That is to say, during flight through icing conditions the central track 7C is energised continuously so that the region of the erosion shield around the extreme leading edge is maintained above freezing point continuously, this being the region of maximum impact with water droplets during flight. Ice therefore cannot form on the erosion shield in the region of track 7C and this region always runs "wet", with a significant proportion of the impacting water being carried off in the airstream. Aft of this anti-iced region the tracks 7B, 7A, 7D and 7E are not energised continuously but are used for "runback" de-icing. That is to say water running back from the anti-iced leading edge region forms frozen rivulets over the upper and lower surfaces of the erosion shield which are removed periodically by energising the tracks 7B, 7A and 7D, 7E to heat the corresponding regions of the erosion shield in a cyclic manner. In this respect the "on" times of the upper and lower heating tracks may alternate, thus limiting the total power requirement for the mat at any time. In other embodiments, however, the upper and lower tracks may be cycled individually to meet the de-icing requirement of any particular blade design or operating conditions.

As previously indicated, the illustrated mat 4 will be one of a plurality of such mats installed in succession across the span of the blade. The illustrated embodiment is of rectangular planform so that the adjacent edges of successive mats extend in the chordwise direction. A possible disadvantage of this arrangement is that continuous chordwise ice "bridges" may form around the erosion shield on the regions above the gaps between the ends of the tracks in adjacent mats which may receive insufficient heat flow to shed this ice. To eliminate this problem the mats may instead be configured to present edges which are oblique to the chord of the blade so that the ends of the tracks are staggered in the chordwise direction and run back water from any spanwise location will always encounter at least one fully heatable region. In other embodiments, heater mats may be provided where the resistive tracks extend in a generally chordwise rather than spanwise direction, and again may be at an oblique angle to the chord.

In FIGS. 2 and 3 the tracks 7A-7E are shown printed on the side of the substrate 6 which faces the erosion shield in use. It may alternatively be preferred to orient the mat with its heating tracks facing inward away from the erosion shield, which would facilitate repair or replacement of the shield without damaging the tracks. The thermal inertia of a thin polyimide substrate as exemplified above should be sufficiently low to permit this orientation without compromising the ice protection performance of the mat.

Although the tracks 7A-7E are shown as rectilinear elements in FIGS. 2 and 3 they may instead be configured with a serpentine (wavy) or other non-linear form for the purpose of stress relief within the blade.

It will be appreciated that heater mats of the same basic design as described above with reference to FIGS. 2 and 3 can similarly be installed around the leading edges of the wings, stabilisers and fins of fixed-wing aircraft.

The invention claimed is:

1. An electrothermal heater mat for ice protection of an aerodynamic surface, said mat comprising a flexible substrate bearing printed heater tracks of a material of selected resistivity, said tracks being formed with a thermosetting ink containing electrically conductive particles.

2. A mat according to claim 1 wherein said ink also contains an inert filler.

3. A mat according to claim 1 wherein said electrically conductive particles comprise particles of carbon.

4. A mat according to claim 3 wherein said ink also contains particles of metal.

5. A mat according to claim 1 wherein said ink comprises a phenolic or epoxy resin.

6. A mat according to claim 1 wherein said flexible substrate also bears printed conductors for the supply of electrical energy to said tracks, said conductors being formed with an ink containing particles of metal.

7. A mat according to claim 6 wherein the ink of said conductors comprises particles of metal in a thermosetting resin.

8. A mat according to claim 6 wherein the ink of said conductors comprises particles of metal in a solvent having a boiling point above ambient temperature.

9. A mat according to claim 1 including a printed dielectric layer over said tracks.

10. A mat according to claim 9 comprising further heater tracks, and/or conductors for the supply of electrical energy to heater tracks, printed onto said dielectric layer.

11. A mat according to claim 1 wherein said flexible substrate is a polyimide sheet.

12. A mat according to claim 1 wherein said flexible substrate is a reinforcement cloth incorporated in a polymer composite material.

13. A method of producing an electrothermal heater mat for ice protection of an aerodynamic surface by printing heater tracks of a material of selected resistivity onto a flexible substrate with a thermosetting ink containing electrically conductive particles and curing such ink.

14. A method according to claim 13 wherein such ink is cured at an elevated temperature.

15. A method according to claim 13 wherein said tracks are formed by screen printing.

16. A method according to claim 13 wherein said tracks are printed in a single layer.

17. A method according to claim 13 wherein conductors for the supply of electrical energy to said tracks are formed by printing onto the flexible substrate with an ink containing particles of metal.

18. A structure including an aerodynamic surface and equipped with an electrothermal heater mat in proximity to such surface for ice protection of the same, said mat comprising a flexible substrate bearing printed heater tracks of a material of selected resistivity, said tracks being formed with a thermosetting ink containing electrically conductive particles.

19. A structure according to claim 18 being an aerodynamic lift-generating structure with said heater mat extending around the leading edge region thereof.

20. A structure according to claim 19 together with an electrical supply system adapted to control the energisation of said tracks such that in use for ice protection those tracks located in the region of the extreme leading edge of the structure are energised for longer time periods than tracks located aft thereof.

21. A structure according to claim 20 wherein in use for ice protection those tracks located in the region of the extreme leading edge of the structure are energised substantially continuously while tracks located aft thereof are energised cyclically.

22. A structure according to claim 19 wherein in use for ice protection the energisation of tracks located in the region of an upper surface of the structure alternates with the energisation of tracks located in the region of a lower surface of the structure.

23. A structure according to claim 19 being a helicopter rotor blade with said heater mat installed beneath an erosion shield thereof.

* * * * *